United States Patent
Odoni et al.

(10) Patent No.: US 9,794,103 B2
(45) Date of Patent: Oct. 17, 2017

(54) METHOD AND APPARATUS FOR MULTIPLE ANTENNA COMMUNICATIONS, AND RELATED SYSTEMS AND COMPUTER PROGRAM

(75) Inventors: Marco Odoni, Mulazzano (IT); Arnaldo Spalvieri, Milan (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 1286 days.

(21) Appl. No.: 12/109,166

(22) Filed: Apr. 24, 2008

(65) Prior Publication Data

US 2009/0268854 A1    Oct. 29, 2009

(51) Int. Cl.
| | |
|---|---|
| *H04B 7/02* | (2017.01) |
| *H04L 1/02* | (2006.01) |
| *H04L 27/34* | (2006.01) |
| *H04L 25/00* | (2006.01) |
| *H04L 27/26* | (2006.01) |

(52) U.S. Cl.
CPC .............. *H04L 27/34* (2013.01); *H04L 25/00* (2013.01); *H04L 27/2601* (2013.01)

(58) Field of Classification Search
USPC ........................ 375/262, 264, 267, 273, 341
See application file for complete search history.

(56) References Cited

U.S. PATENT DOCUMENTS

| | | | | |
|---|---|---|---|---|
| 5,321,725 A | * | 6/1994 | Paik et al. .................... | 375/265 |
| 6,160,854 A | * | 12/2000 | Heegard et al. .............. | 375/265 |
| 7,778,341 B2 | * | 8/2010 | Tong et al. ................... | 375/265 |
| 2004/0066866 A1 | * | 4/2004 | Tong et al. ................... | 375/347 |
| 2005/0068918 A1 | * | 3/2005 | Mantravadi et al. ......... | 370/328 |

OTHER PUBLICATIONS

M. Magarini, A. Spalvieri (2004); A suboptimal detection scheme for MIMO systems with non-binary constellations; 15th IEEE International Symposium on PIMRC; 3: 1579-1582.

(Continued)

*Primary Examiner* — Shuwang Liu
*Assistant Examiner* — Sung Ahn
(74) *Attorney, Agent, or Firm* — Seed IP Law Group LLP

(57) ABSTRACT

A method of detecting sequences of multi-level encoded symbols. The multi-level encoded symbols are mapped and modulated with a modulation scheme having a number of constellation points identified by a sequence of bits arranged in at least a first and a second group. The first group is encoded with a first encoding scheme, and the second group is encoded with a second coding scheme, and the multi-level encoded symbols are transmitted by multiple transmitting sources and received as a received vector by multiple receiving elements.

A first set of candidate sequences is selected and a first set of probability information is calculated for the first set of candidate sequences. Then the first group of bits of the symbols are decoded. The decoded bits of the first group are re-encoded and used to select a sub-set of constellation points.

A second set of candidate sequences is selected based on this sub-set of constellation points and a second set of probability information is calculated for the second set of candidate sequences. Finally, the second group of bits of the symbols are decoded.

19 Claims, 3 Drawing Sheets

(56) References Cited

OTHER PUBLICATIONS

Lutz H.-J. Lampe, Robert Schober, Roert Fisher (2004); Multilevel coding for multiple-antenna transmission; IEEE Transactions on Wireless Communications; 3(1): 203-208.
Hideki Imai, Shuji Hirakawa (1977); A new multilevel coding method using error-correcting codes; IEEE Transactions on Information Theory; IT-23(3): 371-377.
Babak Hassibi (2000); An efficient square-root algorithm for BLAST; IEEE Proceedings ICASSP; 2: II737-II740.

* cited by examiner

US 9,794,103 B2

METHOD AND APPARATUS FOR MULTIPLE ANTENNA COMMUNICATIONS, AND RELATED SYSTEMS AND COMPUTER PROGRAM

TECHNICAL FIELD

An embodiment of the present disclosure relates to communication technology.

Specifically, an embodiment of the disclosure concerns a multi-level coded modulation arrangement applied to a spatial multiplexing Multiple-Input Multiple-Output (MIMO) Orthogonal Frequency Division Multiplexing (OFDM) systems.

BACKGROUND

Throughout this description various publications are cited as representative of related art. For the sake of simplicity, these documents will be referred by reference numbers enclosed in square brackets, e.g. [x]. A complete list of these publications ordered according to the reference numbers is reproduced in the section entitled "List of references" at the end of the description. These publications are incorporated herein by reference.

Multiple-Input Multiple-Output (MIMO) Orthogonal Frequency Division Multiplexing (OFDM) systems are promising solutions for next generation Wireless Local Area Network (WLAN) system thanks to the high data rate achievable. The OFDM technique is a promising method for high data rate communication systems due to its simple implementation via FFT and robustness against frequency selective fading channels. In a spatial multiplexing MIMO system, high data rate transmission is achieved by de-multiplexing the data sequence into N sub-streams that are transmitted through N antennas. Thus, MIMO-OFDM systems can provide high performance and reliable transmission.

The introduction of more antennas at the receive side involves a remarkable computation burden related to the extraction of the Log-Likelihood Ratios (LLR) from the received signal. This applies i.a. to the computation of the A-Posteriori Probabilities (APPs), which is very complex and whose computational complexity increases with $p^N$, where p is the number of constellation points.

Therefore, typically only suboptimal techniques are used when p is large. An example of such a suboptimal technique is disclosed in [1].

Other solutions are based on multilevel coding for multiple-antenna systems. For example, [2] presents a comparison among different schemes.

SUMMARY

An embodiment of the disclosure provides a fully satisfactory response to the needs outlined in the foregoing. Embodiments of this disclosure provide an effective low complexity solution for multilevel coding and decoding for multiple antenna systems.

Embodiments of the disclosure relate to a method, corresponding apparatus, as well as a corresponding related computer program product, loadable in the memory of at least one computer and including software code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is evidently intended to highlight the possibility for the method to be implemented in a distributed/modular fashion among software and hardware components.

An embodiment of the arrangement described herein is a method and apparatus to detect sequences of digitally modulated symbols, transmitted by multiple sources (e.g. antennas).

An embodiment of the arrangement described herein is a receiver to detect and decode constellation symbols being encoded with the multilevel scheme.

An embodiment of the arrangement described herein relates to a staged LLR (e.g. APP) computation and channel decoding arrangement for a MIMO-OFDM system based on a multilevel coding and spatial multiplexing.

In an embodiment, a multilevel receiver is provided having a hierarchical architecture in order to reduce the above mentioned complexity.

In an embodiment, a multilevel receiver may perform the following steps:
 computing the LLRs for the first level decoder,
 decoding the first level code and re-encoding decisions, and
 selecting sequences of sub-constellations for the second level detection.

BRIEF DESCRIPTION OF THE DRAWINGS

For a more complete understanding of this disclosure and its features, reference is now made to the following description of exemplary embodiments, taken in conjunction with the accompanying drawings.

DETAILED DESCRIPTION

FIGS. 1 through 5 and the various embodiments described in this disclosure are by way of illustration only and should not be construed in any way to limit the scope of the disclosure. Those skilled in the art will recognize that the various embodiments described in this disclosure may easily be modified and that such modifications fall within the scope of this disclosure.

Figure 1:
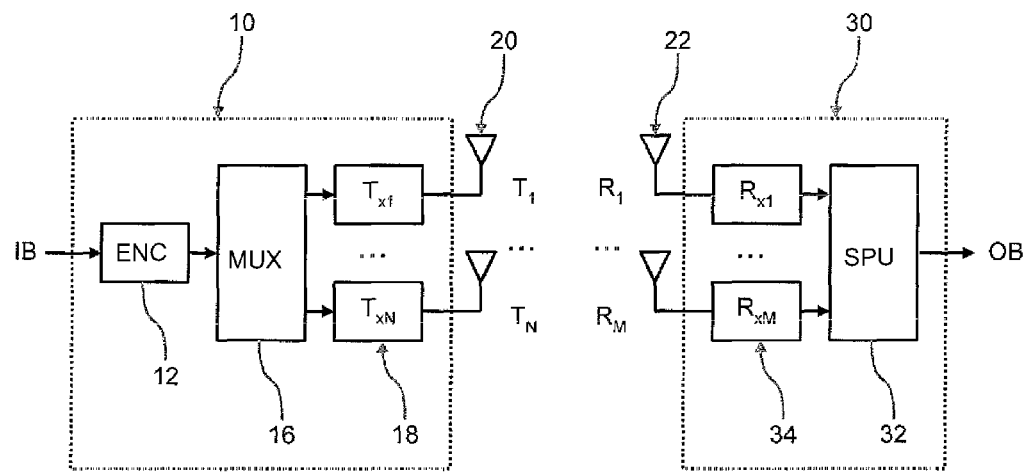
FIG. 1 illustrates a block diagram of an embodiment of a MIMO communication system.

FIG. 1 illustrates an exemplary MIMO system having N transmitting and M receiving antennas which may be used to transmit OFDM signal with S sub-carriers.

As shown in FIG. 1, such a MIMO system typically includes a MIMO transmitter 10 and a MIMO receiver 30, wherein the MIMO transmitter 10 is coupled to multiple transmit antennas 20 (denoted $T_1$ to $T_N$), and the MIMO receiver 30 is coupled to multiple receive antennas 22 (denoted $R_1$ to $R_M$).

As well known to those skilled in the art, such a MIMO system receives an input bit stream IB, which is encoded by an encoder 12 and de-multiplexed by a demultiplexer 16 to one of several transmission chains 18 (denoted $T_{x1}$ to $T_{xN}$), each transmission chain 18 being coupled to one of the transmit antennas 20. Instead of a single encoder 12, each transmission chain 18 may have its own encoder operating independently from the other transmission chains 18.

Similarly, a MIMO receiver may comprise several receiving chains 34 (denoted $R_{z1}$ to $R_{xM}$) coupled to the receive antennas 22. In an embodiment, each receive antenna 22 receives signals from all of the transmit antennas 20. In an embodiment, the MIMO receiver 30 comprises also a signal processing unit 32 to detect and decode the symbols in order to reconstruct the original data stream, which may then be provided as output data stream OB.

In an embodiment, the global average radiated power of the OFDM signal is fixed to S and is independent of the total number of transmitting antennas.

As well known to those skilled in the art, the communication channel for a MIMO system having N transmit antennas and M receive antennas may be modeled, for each sub-carrier, as a flat fading channel described by a channel state information matrix H of dimension M×N:

$$r = H \cdot \tilde{a} + w$$

where $\tilde{a} = [\tilde{a}_1, \ldots, \tilde{a}_N]^T$ denotes the vector of transmitted symbols, each chosen from a set A, r corresponds to the received M-dimensional vector, and w is a vector of complex Gaussian random variables with zero mean and variance $\sigma_{w_2}$.

The vector $\tilde{a}$ may be considered as a point in the $A^N$ space, and usually the elements of the channel matrix H have a uniform distributed phase and Rayleigh-distributed magnitude with average power equal to 1.

Moreover, such channel matrix H may be considered as being independent of both $\tilde{a}$ and w and is typically known at the receive side.

Figure 2:
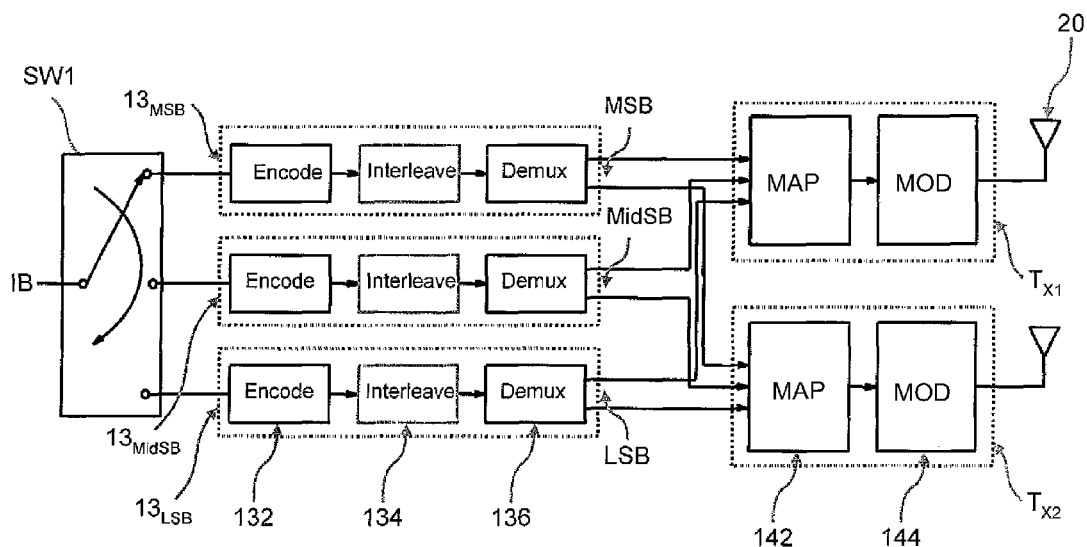
FIG. 2 illustrates a block diagram of an embodiment of a multi-level MIMO transmitter.

In an embodiment of this disclosure, a multilevel coded modulation scheme is used. FIG. 2 shows an embodiment of a MIMO transmitter with a multi-level encoding scheme, which may be used e.g. for 64QAM constellation.

FIG. 2 shows an embodiment of a MIMO transmitter 10 with three encoding levels denoted $13_{LSB}$, $13_{MidSB}$, and $13_{MSB}$, respectively, used to encode data which is transmitted via two transmit antennas 20.

Figure 3:
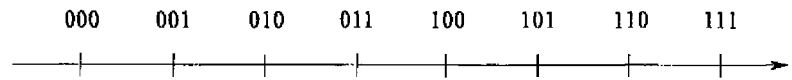
FIG. 3 illustrates an embodiment of an 8PAM mapping.

In an embodiment, natural mapping on each dimension is used. As well known to those skilled in the art, a 64QAM constellation may be considered as being constructed by two orthogonal 8PAM constellations whose labeling is shown in FIG. 3. The least significant bit of the 8PAM constellation may take alternating values on the real axis and the Euclidean distance between two adjacent sub-constellations is relatively small.

Multilevel coding may be used to provide a higher code protection for the least significant bit. In an embodiment of this disclosure, the number of bits of the constellation symbols is divided into three portions denominated in the following as least significant bits (LSB), most significant bits (MSB) and the remaining bits therebetween (MidSB).

In the exemplary embodiment shown, the 6 bits of a 64QAM modulated symbol are organized in two LSBs, two MidSBs, and two MSBs.

Accordingly, the MIMO transmitter 10 has three different levels each being composed of an encoder 132, an optional interleaver 134, and a demultiplexer 136.

Input data IB is sent, e.g. by means of a switch SW1, to one of the encoding chains $13_{LSB}$, $13_{MidSB}$, or $13_{MSB}$, where the data is encoded by one of the encoders 132. Subsequently, the encoded data is de-multiplexed by the corresponding demultiplexer 136 to one of two transmission chains $T_{x1}$ or $T_{x2}$, each being composed of a mapper 142, such as a 64QAM mapper, and a modulator 144, such as an OFDM modulator.

In an embodiment, the encoder 132 of the first level $13_{LSB}$ provides the two LSBs of the 64QAM constellation symbol, which are encoded with a higher coding rate than the encoders of the other levels.

In an embodiment, two independent encoders may be used as the encoder 132 of the first level $13_{LSB}$, each providing the least significant bit of an 8PAM constellation symbol.

Once the sequence of LSBs has been successfully decoded at the receiver side, the decoder of the second level bits (MidSB) may operate with a higher Euclidean distance and therefore the second level bits may have a lower code protection.

In an embodiment, the encoder 132 of the second level $13_{MidSB}$ provides the two MidSBs of the 64QAM constellation symbol with a lower coding rate than the encoder 132 of the first level $13_{LSB}$.

Finally, the MSBs have the largest Euclidean distance and therefore may have the lowest protection or, in particular cases, may even be left un-coded.

In an embodiment, the encoder 132 of the third level $13_{MSB}$ provides the two MSBs of the 64QAM constellation symbol with the lowest coding rate compared to the encoders of the other levels.

As mentioned in the foregoing, also the higher level encoders may be realized by two independent encoders which provide the respective bits of two independent 8PAM constellations.

Those skilled in the art will appreciate that the number of groups (i.e. levels of the multilevel encoder) and the number of bits in each group may change according to the used modulation scheme. Moreover, the groups may not necessarily have the same number of bits.

Those skilled in the art will similarly appreciate that a single configurable encoding chain may be used, wherein the encoding rate is changed.

Figure 4:
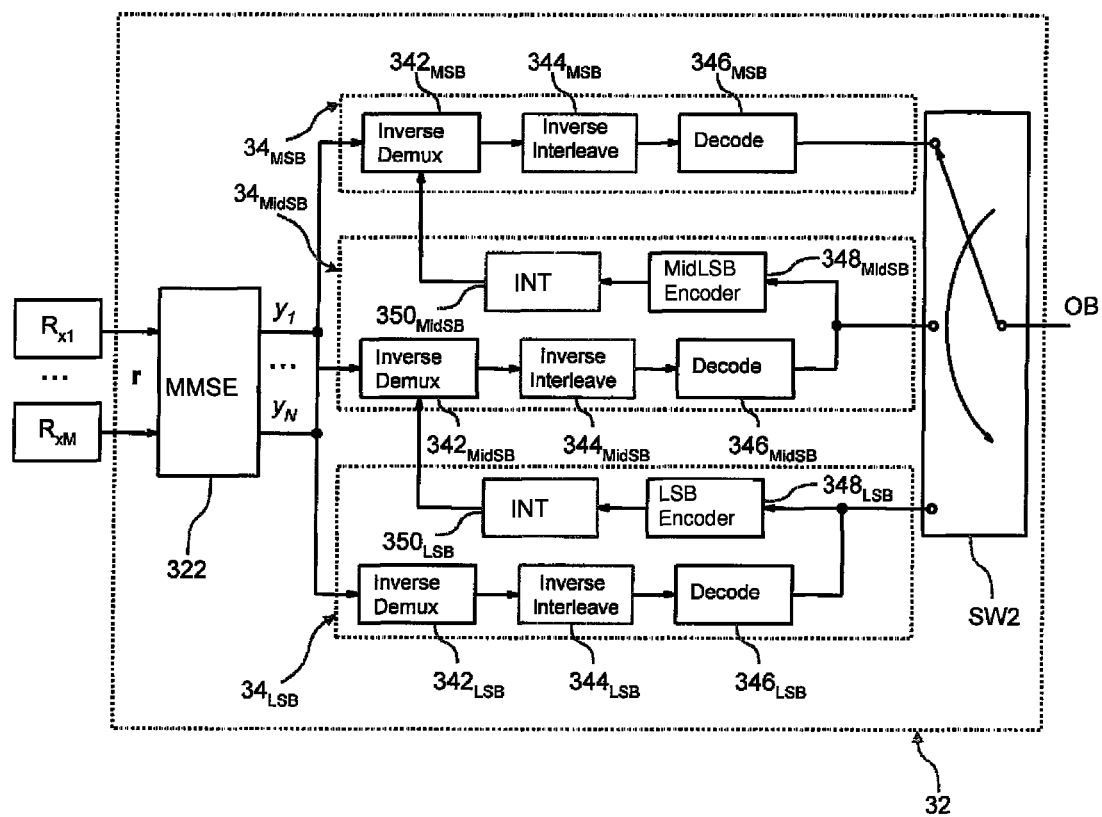
FIG. 4 illustrates a block diagram of an embodiment of a multi-level MIMO receiver.

FIG. 4 shows an embodiment of a possible MIMO receiver 30, which is based on the staged decoding. Such a MIMO receiver 30 comprises a signal processing unit 32 coupled to the receiving chains $R_{x1}$ and $R_{x2}$. The signal processing unit 32 performs the detection and decoding of the received symbols.

In an embodiment, the signal processing unit 32 comprises a hierarchical architecture comprised of three detection and decoding stages $34_{LSB}$, $34_{MidSB}$ and $34_{MSB}$ which provide the LSB, MidSB and MSB bits of the symbols, respectively. In an embodiment the hierarchical architecture is implemented with a pipeline.

The complexity of LLR computation in a MIMO spatial multiplexing system depends on the size of the constellation p and on the number of transmitting antennas N. For example, a classical APP computation would require the computation of $p^N$ correlations. In the case of 64QAM constellation and 2 transmitting antennas the computational cost would be 4096 correlations.

An embodiment of this disclosure relates to a reduction of the computational complexity by means of a reduction of the number of correlations to be calculated, while maintaining performance comparable to the optimal one.

In an embodiment, not all possible sequences are verified but only a sub-set of candidate sequences is verified. In an embodiment, the first stage $34_{LSB}$ comprises a block $342_{LSB}$, which selects a sub-set of candidate sequences and calculates the LLRs for these candidate sequences.

These candidate sequences and/or the LLRs may then be de-interleaved by a deinterleaver $344_{LSB}$, and decoded by a decoder $346_{LSB}$. Specifically, the decoder $346_{LSB}$ of the first level $34_{LSB}$ is responsible for selecting the most suitable LSBs based on the set of candidate sequences and/or the LLRs.

In the following, a possible arrangement will be described to select the candidate sequences for the first level. Those skilled in the art will however appreciate that any other arrangement may be used to select such candidate sequences.

In an embodiment, a minimum mean square error (MMSE) linear interface 322 is used, which provides soft decision statistic for the symbols sent via the multiple antennas.

Such a MMSE linear interface 322 may use the following error vector:

$$e = \tilde{a} - \hat{a} = \tilde{a} - G \cdot r$$

where G is a N×M linear weight matrix.
By minimizing the mean square error defined as:

$$MSE = E\{\|e\|^2\} = E\{\|\tilde{a} - G \cdot r\|^2\}$$

and in the case of average power radiated from each transmit antenna 20 equal to 1/N, the following MMSE weight matrix may be calculated [4]:

$$G_{MMSE} = (H' \cdot H + \alpha \cdot I_N)^{-1} \cdot H'$$

where $\alpha = N \cdot \sigma^2$, $I_N$ is an N×N identity matrix and "'" denotes a conjugate transposition.

The soft decision statistics for the symbol sent from i-th antenna may therefore be calculated as:

$$y_i = G_{MMSE,i} \cdot r$$

where $G_{MMSE,i}$ is the i-th row of the matrix $G_{MMSE}$.

These soft decision statistics are then sent to the block $342_{LSB}$ in order to select possible candidate sequences and to calculate LLRs.

Figure 5:
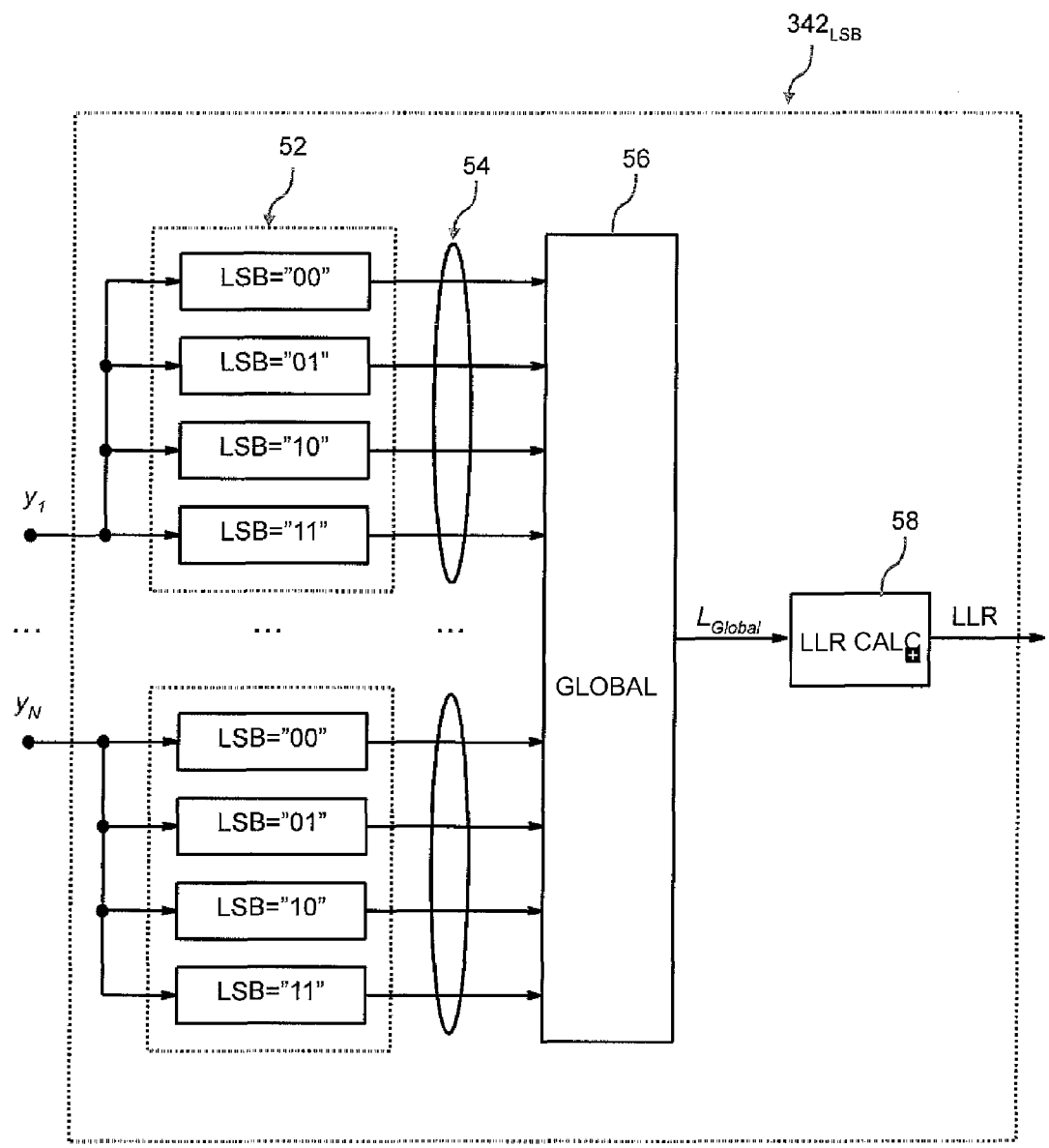
FIG. 5 is a block diagram showing an embodiment of how candidate sequences may be selected.

FIG. 5 shows an exemplary arrangement to select the candidate sequences for the first level.

In an embodiment, the 64 possible constellation symbols of the 64QAM modulation are divided into four local sub-lists 52 one for each of the four sub-constellations having the LSB fixed to "00", "01", "10", "11". Such sub-lists 52 may be interpreted as four independent 16QAM modulations. The number of sub-lists may depend on the number of bits identified as LSBs on the transmitter side and the number of elements in each sub-list may depend on the used modulation scheme.

For each local sub-list 52 of constellation symbols a local sub-list with $C_{LSB}$ candidate symbols may be determined, wherein the candidate symbols are typically the symbols closest (i.e. in terms of Euclidean distance) to the soft decision $y_i$. Moreover, block 52 may also consider a-priori or a-posteriori information in order to select the candidate symbols.

In an embodiment, a local list 54 associated with the i-th transmit antenna is obtained as the union of the four local sub-lists of candidate symbols.

In an embodiment, a block 56 then generates a global list $L_{Global}$ of candidate sequences having $(4 \cdot C_{LSB})^N$ elements by combining, e.g. in all possible ways, the candidate symbols of the local lists 54. Duplicate candidate sequences may be removed in order to further reduce complexity.

A block 58 is then able to calculate the LLRs for the candidate sequences. In an embodiment, a max-log Maximum-A-Posteriori-Probability (MAP) computation is used to calculate the LLRs:

$$LLR(b_k) = m(r|b_k = 0) - m(r|b_k = 1)$$

where $$m(r|b_k = 0) = \min_{l \in L_{Global}(b_k=0)} \|r - 1 \cdot H\|^2, k = 1, 2, \ldots, \log_2 p,$$

and $$m(r|b_k = 1) = \min_{l \in L_{Global}(b_k=1)} \|r - 1 \cdot H\|^2, k = 1, 2, \ldots, \log_2 p$$

where $L_{Global}(b_k=0,1)$ indicates the elements of the global list having $b_k=0,1$.

The first level LLRs output by block $342_{LSB}$ can then be processed by the first level channel decoder $346_{LSB}$ in order to extract the bits used to create the LSBs of the symbols.

These bits may be used to select the winner sub-constellations among the four sub-constellations. Specifically, once the first level is decoded, these bits are re-encoded by an LSB encoder $348_{LSB}$ and, where needed, re-interleaved by an interleaver $350_{LSB}$.

The second level $34_{MidSB}$ may operate then on the selected sub-constellations in a similar manner as the first level $34_{LSB}$.

In an embodiment, the 16 possible constellation symbols of the 64QAM modulation, which have been selected by the first level $34_{LSB}$ for a specific antenna, are divided into four local sub-lists, one for each of the four sub-constellations having the MidSB fixed to "00", "01", "10", "11". Such sub-lists may be interpreted as four independent QPSK modulations. Again, the number of sub-lists may depend on the number of bits identified as MidSB bits on the transmitter side and the number of elements in each sub-list may depend on the modulation scheme used.

Subsequently, the block $342_{MidSB}$ is able to generate a global list of candidate sequences for the second level having $(4 \cdot C_{MidSB})^N$ elements by combining, e.g. in all possible ways, the candidate symbols of the local lists of the second level and to calculate the LLRs for the MidSB bits of all antennas.

The candidate sequences and/or the LLRs of the second level output by block $342_{MidSB}$ are then optionally de-interleaved by a deinterleaver $344_{MidSB}$ and processed by the second level channel decoder $346_{MidSB}$ in order to extract the bits used to create the MidSB of the symbols.

These bits may be used to select the winner sub-constellations among the four sub-constellations of the second level. Specifically, once the second level is decoded, these bits are re-encoded by a MidSB encoder $348_{MidSB}$ and, where needed, re-interleaved by an interleaver $350_{MidSB}$.

Also the third level $34_{MSB}$ may operate on the sub-constellations selected by the second level in a similar manner as the previous levels.

In an embodiment, the four possible constellation symbols of the 64QAM modulation, which have been selected by the second level for a specific antenna, are divided into four local sub-lists one for each of the four sub-constellations having the MSB fixed to "00", "01", "10", "11". Again, the number of sub-lists may depend on the number of bits identified as MSBs on the transmitter side and the number of elements in each sub-list may depend on the modulation scheme used.

Subsequently, block $342_{MSB}$ is able to generate a global list of candidate sequences for the third level having $(4 \cdot C_{MSB})^N$ elements by combining, e.g. in all possible ways, the candidate symbols of the local lists of the third level and to calculate the LLRs for the MSB bits of all antennas.

The candidate sequences and/or the LLRs of the third level output by block $342_{MSB}$ the are then optionally de-interleaved by a deinterleaver $344_{MSB}$ and processed by the third level channel decoder $346_{MSB}$ in order to extract the bits used to create the MSB of the symbols.

The final bit stream OB may then be created by combining e.g. by means of a switch SW2 the separate bits used for the creation of the LSBs, MidSBs and MSBs of the symbols.

The overall complexity, in term of correlations, of the complete detection algorithm, can be calculated, for a 64QAM constellation having three levels, as follows:

$$(4 \cdot C_{LSB})^N + (4 \cdot C_{MidSB})^N + (4 \cdot C_{MSB})^N$$

where:

$$\begin{cases} 1 \leq C_{LSB} \leq 16 \\ 1 \leq C_{MidSB} \leq 4 \\ C_{MSB} = 1 \end{cases}$$

By choosing $C_{LSB}=C_{MidSB}=C_{MSB}=1$ and $N=2$, the system presents the minimum computational complexity, while the system has the highest complexity for $C_{LSB}=16$, $C_{MidSB}=4$, $C_{MSB}=1$.

The arrangement is therefore tunable, because the number of candidate symbols selected for each level may be chosen according to the desired performance requirements and computational power. Such a re-configuration may also be performed in real-time in order to take into account the current transmission conditions. For example, the number of candidate sequences may be increased due to a high error rate.

Consequently, without prejudice to the underlying principles of the disclosure, the details and the embodiments may vary, even appreciably, with reference to what has been described by way of example only, without departing from the scope of the disclosure.

LIST OF REFERENCES

[1] M. Magarini, A. Spalvieri. A suboptimal detection scheme for MIMO systems with non-binary constellations.
[2] L. Lampe, R. Schober, R. Fischer. Multilevel coding for multiple-antenna transmission. IEEE Trans. on Wireless Comms., vol. 3, No. 1, January 2004.
[3] H. Imai, S. Hirakawa. A new multilevel coding method using error-correcting codes. IEEE Trans. on Information Theory, vol. IT-23, No. 3, 1977.
[4] B. Hassibi, "An efficient square-root algorithm for BLAST", in Proc. ICASSP, Istanbul, Turkey, vol. II, pp. 737-740, 5-9 Jun. 2000.

What is claimed is:

1. A method of detecting sequences of multi-level encoded symbols, comprising:
    receiving, by multiple receiving elements, the multi-level encoded symbols that are mapped and modulated with a modulation scheme having a number of constellation points identified by a sequence of bits arranged in at least a first and a second group, the first group being encoded with a first encoding scheme and the second group being encoded with a second encoding scheme, and wherein the multi-level encoded symbols are transmitted by multiple transmitting elements, the multiple transmitting and receiving elements jointly defining a transmission channel modeled by a channel state information matrix and the received symbols being grouped as a received vector;
    calculating a soft decision for each of the receiving elements based on the received vector and on the channel state information matrix;
    for each of the receiving elements, selecting a first set of candidate sequences based upon constellation points of the modulation scheme and the received symbols, the selecting the first set of candidate sequences including,
        selecting a local sub-set of constellation points for each possible sequence of bits for the first group of bits;
        selecting a local sub-set of candidate symbols for each sub-set of constellation points;
        selecting as candidate symbols the constellation points in the sub-set of constellation points based upon the soft decision; and
        combining the sets of candidate symbols in order to form the first set of candidate sequences.

2. The method of claim 1 further comprising:
    calculating a first set of probability information for the first set of candidate sequences;
    decoding the first group of bits of the symbols encoded with a first encoding scheme based on the first set of probability information;
    re-encoding the decoded first group of bits of the symbols;
    selecting a sub-set of constellation points based on the re-encoded first group of bits;
    selecting a second set of the candidate sequences based on the sub-set of constellation points and the received symbols;
    calculating a second set of probability information for the second set of candidate sequences; and
    decoding the second group of bits of the symbols encoded with a second encoding scheme based on the second set of probability information.

3. The method of claim 2, wherein said selecting a first set of candidate sequences includes:
    selecting for each receiving element a set of candidate symbols, and
    combining said sets of candidate symbols in order to form said set of candidate sequences.

4. The method of claim 3, wherein said selecting for each receiving element a set of candidate symbols includes:
    selecting a local sub-set of constellation points for each possible sequence of bits for said first group of bits,
    selecting a local sub-set of candidate symbols for each sub-set of constellation points, and
    combining said local sub-set of candidate symbols in order to form said set of candidate sequences.

5. The method of claim 4, wherein said selecting a local sub-set of candidate symbols for each sub-set of constellation points includes selecting as candidate symbols the constellation points in said sub-set of constellation points having the shortest Euclidean distance from said soft decision.

6. The method of claim 1 wherein said selecting a sub-set of constellation points as a function of said re-encoded first group of bits includes selecting the constellation points of said modulation scheme having said first group of bits fixed to said re-encoded first group of bits.

7. The method of claim 2, wherein calculating a set of probability information for a set of candidate sequences includes calculating Log-Likelihood Ratios as a function of a-posteriori bit information for said set of candidate sequences.

8. The method of claim 2, wherein said first group of bits is encoded with a higher coding rate than said second group of bits.

9. The method of claim 1, wherein said modulation scheme includes a 64QAM mapping.

10. The method of claim 1, wherein said modulation scheme includes an OFDM modulation.

11. The device of claim 1, wherein said device has at least one pipeline for performing said detecting sequences of multi-level encoded symbols.

12. The receiver of claim 1, wherein said transmitting sources and said receiving elements are antennas.

13. A device, comprising:
a receiver for receiving symbols mapped with a modulation scheme having a number of constellation points identified by a sequence of bits, wherein the received symbols are grouped as a received vector;
a first selector configured to select a first set of candidate sequences based on the constellation points of the modulation scheme and the received symbols, wherein the first selector further includes a number of soft decision logic blocks that is equivalent to a number of receiving antennae associated with the device and wherein the first selector is further configured to,
calculate a soft decision, for each of the receiving antennas, based on the received vector and on a channel state information matrix modelling a transmission channel;
select a set of candidate symbols for each antenna, wherein the first selector is configured to,
select a local sub-set of constellation points for each possible sequence of bits for said first group of bits,
select a local sub-set of candidate symbols for each sub-set of constellation points, wherein the first selector is further configured to select as candidate symbols the constellation points in said sub-set of constellation points having the shortest Euclidean distance from the soft decision,
combine said local sub-set of candidate symbols in order to form said set of candidate sequences, and
combine the sets of candidate symbols in order to form the set of candidate sequences;
a first calculator configured to calculate a first set of probability information for the first set of candidate sequences;
a first decoder configured to decode the first group of bits of the symbols encoded with a first encoding scheme based on the first set of probability information;
an encoder configured to re-encode the decoded first group of bits of the symbols,
a second selector configured to select a sub-set of constellation points based on the re-encoded first group of bits,
a third selector configured to select a second set of said candidate sequences based on the sub-set of constellation points and the received symbols,
a second calculator configured to calculate a second set of probability information for the second set of candidate sequences, and
a second decoder configured to decode the second group of bits of the symbols encoded with a second encoding scheme based on the second set of probability information.

14. A non-transitory computer-readable medium having computer-executable instructions for receiving multi-level encoded symbols mapped with a modulation scheme having a number of constellation points identified by a sequence of bits arranged in at least a first group and a second group, the first group being encoded with a first encoding scheme and the second group being encoded with a second encoding scheme, and wherein the multi-level encoded symbols are transmitted by multiple transmitting elements and received by multiple receiving elements, the multiple transmitting and receiving elements jointly defining a transmission channel modeled by a channel state information matrix and the received symbols being grouped as a received vector, wherein the computer-executable instructions, when executed on a computer, are operable for:
calculating a soft decision for each of a plurality of the receiving elements based on the received vector and on the channel state information matrix;
for each of the receiving elements, selecting a first set of candidate sequences as a function of the constellation points of the modulation scheme and the received symbols, the selecting the first set of candidate sequences including,
selecting a local sub-set of constellation points for each possible sequence or bits for the first group of bits;
selecting a local sub-set of candidate symbols for each sub-set of constellation points;
selecting as candidate symbols the constellation points in the sub-set of constellation points based upon the soft decision; and
combining the sets of candidate symbols in order to form the first set of candidate sequences;
calculating a first set of probability information for the first set of candidate sequences,
decoding the first group of bits of the symbols encoded with a first encoding scheme as a function of the first set of probability information,
re-encoding the decoded first group of bits of said symbols,
selecting a sub-set of constellation points as a function of the re-encoded first group of bits,
selecting a second set of said candidate sequences as a function of the sub-set of constellation points and the received symbols,
calculating a second set of probability information for the second set of candidate sequences, and
decoding the second group of bits of the symbols encoded with a second encoding scheme as a function of the second set of probability information.

15. The device of claim 13, wherein the modulation scheme includes a 64QAM mapping.

16. The device of claim 13, wherein the modulation scheme includes an OFDM modulation.

17. The device of claim 13, wherein the first calculator is operable to calculate the first set of probability information for the first set of candidate sequences based on calculating Log-Likelihood Ratios as a function of a-posteriori bit information for the set of candidate sequences.

18. The non-transitory computer-readable medium of claim 14, wherein the multi-level symbols are mapped with a QAM modulation scheme.

19. The non-transitory computer-readable medium of claim 18, wherein the QAM modulation scheme further includes OFDM modulation.

* * * * *